United States Patent
Dreier et al.

(10) Patent No.: US 7,026,459 B2
(45) Date of Patent: Apr. 11, 2006

(54) AZO DYES

(75) Inventors: Romeo Dreier, Fehren (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 28 days.

(21) Appl. No.: 10/508,713

(22) PCT Filed: Mar. 13, 2003

(86) PCT No.: PCT/EP03/02614

§ 371 (c)(1),
(2), (4) Date: Sep. 20, 2004

(87) PCT Pub. No.: WO03/080737

PCT Pub. Date: Oct. 2, 2003

(65) Prior Publication Data

US 2005/0176857 A1   Aug. 11, 2005

(30) Foreign Application Priority Data

Mar. 22, 2002   (EP) .................. 02405224

(51) Int. Cl.
C09B 29/42 (2006.01)
C08K 5/3432 (2006.01)
G02B 5/22 (2006.01)
G03F 7/00 (2006.01)

(52) U.S. Cl. ......................... 534/773; 524/99

(58) Field of Classification Search ................ 534/773; 524/99

See application file for complete search history.

(56) References Cited

U.S. PATENT DOCUMENTS

| | | | |
|---|---|---|---|
| 3,974,123 A | 8/1976 | Dehnert et al. | 260/40 |
| 3,998,802 A * | 12/1976 | Dehnert et al. | 534/766 |
| 4,042,578 A | 8/1977 | Dehnert et al. | 260/156 |
| 4,128,545 A | 12/1978 | Dehnert et al. | 260/156 |
| 2004/0031109 A1 | 2/2004 | Clement et al. | 8/507 |
| 2004/0055097 A1 | 3/2004 | Pichler et al. | 8/451 |

FOREIGN PATENT DOCUMENTS

| | | |
|---|---|---|
| DE | 2222873 | 11/1973 |
| EP | 0042486 | 12/1981 |
| EP | 1168046 | 1/2002 |
| FR | 2262681 | 9/1975 |
| GB | 1377505 | 12/1974 |

OTHER PUBLICATIONS

Chemical Abstr. 1982:124514 for EP 0042486 (1981).
Chemical Abstr. 1974:84615 for DE 2222873 (1973).

* cited by examiner

*Primary Examiner*—Fiona T. Powers
(74) *Attorney, Agent, or Firm*—Kevin T. Mansfield

(57) ABSTRACT

The present invention relates to an azo dye of formula (I) wherein $R_1$ and $R_2$ are each independently of the other —NH—$(CH_2CH_2)$—OH, —NH—$CH_2$—CHOH—$CH_2$—OH, —NH—$(CH_2CH_2)$—S—$(CH_2CH_2)$—OH, —NH—$(CH_2CH_2)$—NH—$(CH_2CH_2)$—OH, NH—$CH_2CH_2$—CON$(CH_2CH_2OH)_2$, $R_3$ is —CN or —$CONH_2$, $R_4$ is methyl or trifluoromethyl, $R_5$ is —$CF_3$, —$COOC_2H_5$, $R_6$ is hydrogen or chlorine and $R_7$ is hydrogen, chlorine, bromine or —$NO_2$, to a process for the preparation thereof and to the use thereof in a method of producing mass-coloured plastics or polymeric colour particles

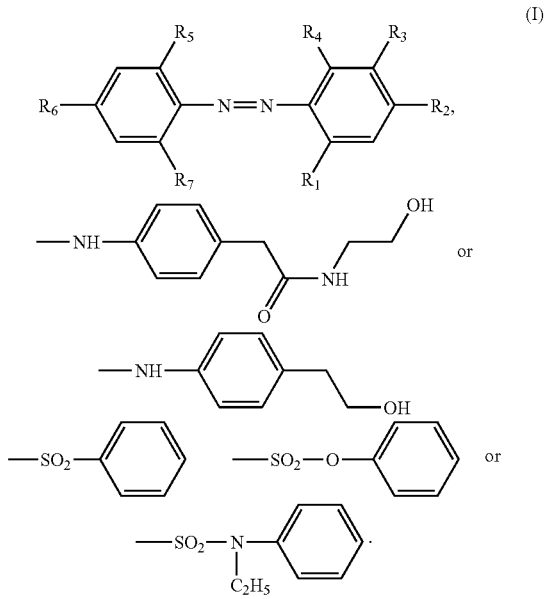

11 Claims, No Drawings

AZO DYES

The present invention relates to novel azo dyes, to a process for the preparation thereof and to the use thereof in a method of producing mass-coloured plastics or polymeric colour particles, and of colouring or printing semi-synthetic or synthetic hydrophobic fibre materials.

Dyes for mass-colouring plastics are known. For example there are described in U.S. Pat. No. 5,367,039 1,4,5,8-tetrasubstituted anthraquinones having (meth)acryloyl groups which can be copolymerised with vinyl monomers and are thus suitable for the production of coloured vinyl polymers.

The dyes used until now do not, however, meet the highest requirements in terms of light fastness and, especially, thermostability.

There is accordingly a need for novel thermostable dyes that produce colorations having a high tinctorial strength and exhibiting light fastness, especially high-temperature light fastness, and that have good all-round fastness properties.

U.S. Pat. No. 3,998,802 discloses 2,6-diaminopyridine-based azo dyes that are suitable for colouring synthetic polyamides and polyesters according to the exhaust process and that are distinguished by good properties of fastness to heat setting and to light.

It has now, surprisingly, been found that specific 2,6-diaminopyridine-based azo dyes are suitable for mass-colouring synthetic polymers, yield colorations having a high tinctorial strength and exhibiting light fastness, especially high-temperature light fastness, and have good all-round fastness properties.

The present invention relates to an azo dye of formula I

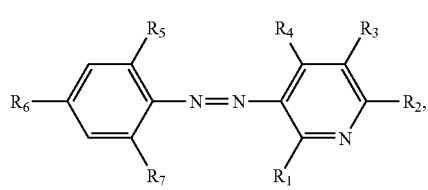
(I)

wherein $R_1$ and $R_2$ are each independently of the other —NH—(CH$_2$CH$_2$)—OH, —NH—CH$_2$—CHOH—CH$_2$—OH, —NH—(CH$_2$CH$_2$)—S—(CH$_2$CH$_2$)—OH, —NH—(CH$_2$CH$_2$)—NH—(CH$_2$CH$_2$)—OH, —NH—(CH$_2$CH$_2$)—NH$_2$, —NH—CH$_2$—CHOH—CH$_2$—NH$_2$, —NH—CH$_2$—CON(CH$_2$CH$_2$OH)$_2$, —NH—CH$_2$CH$_2$—CON(CH$_2$CH$_2$OH)$_2$,

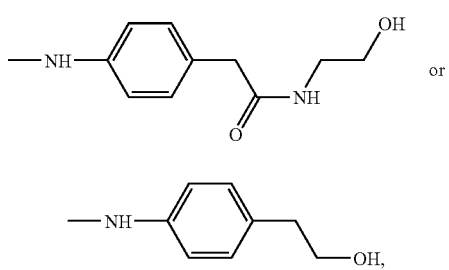

$R_3$ is —CN or —CONH$_2$,
$R_4$ is methyl or trifluoromethyl,
$R_5$ is —CF$_3$, —COOC$_2$H$_5$,

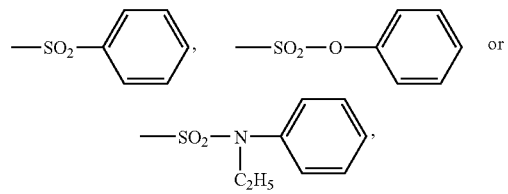

$R_6$ is hydrogen or chlorine and
$R_7$ is hydrogen, chlorine, bromine or —NO$_2$.

The substituents $R_1$ and $R_2$ may be identical or different; preferably, $R_1$ and $R_2$ are identical.

Preference is given to azo dyes of formula I wherein $R_3$ is —CN and $R_4$ is methyl.

Preference is given also to azo dyes of formula I wherein $R_1$ and $R_2$ are —NH—(CH$_2$CH$_2$)—OH or

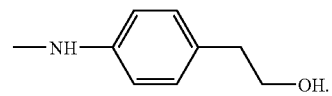

Preference is given furthermore to azo dyes of formula I wherein $R_7$ is hydrogen.

In formula I, $R_8$ is preferably hydrogen.

Especially preferred azo dyes of formula I are the compounds Ia, Ib, Ic and Id:

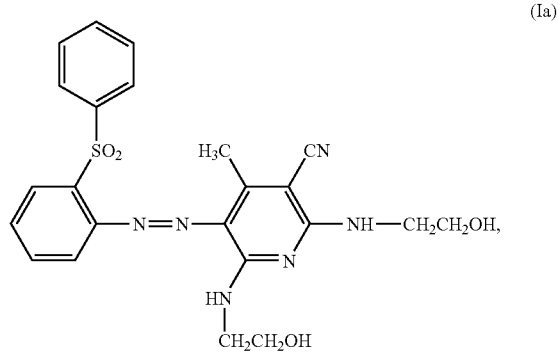
(Ia)

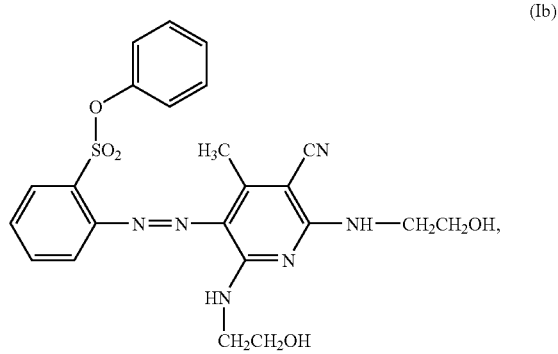
(Ib)

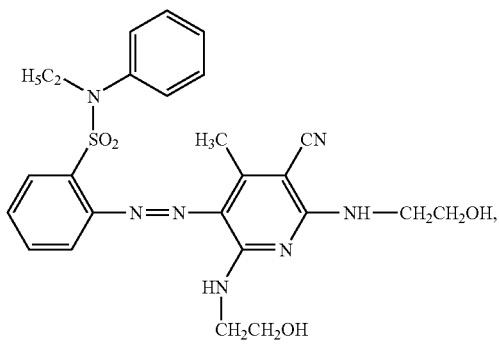

(Ic)

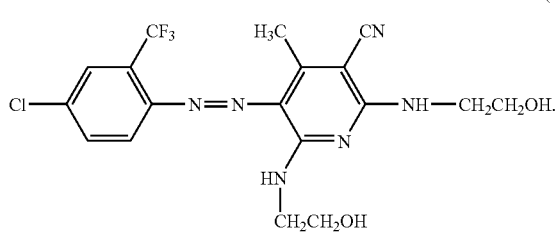

(Id)

The compounds of formula I can be prepared according to known methods, for example by diazotization of aromatic amines and a subsequent coupling reaction.

The invention relates also to a process for the preparation of an azo dye of formula (I) which comprises diazotizing a compound of formula II

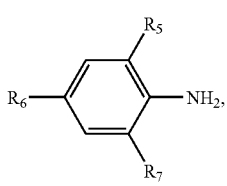

(II)

wherein $R_5$, $R_6$ and $R_7$ are as defined hereinabove, in accordance with a conventional method, and then coupling the diazotized compound to a coupling component of formula III

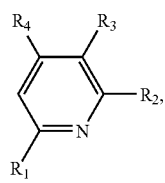

(III)

wherein $R_1$, $R_2$, $R_3$ and $R_4$ are as defined hereinabove.

The diazotization of the compound of formula (II) is carried out in a manner known per se, for example with sodium nitrite in an aqueous acidic medium, for example an aqueous hydrochloric acid medium or aqueous sulfuric acid medium. The diazotization can, however, also be carried out using other diazotizing agents, for example nitrosylsulfuric acid. An additional acid may be present in the reaction medium in the diazotization procedure, e.g. phosphoric acid, sulfuric acid, acetic acid, propionic acid, hydrochloric acid or a mixture of such acids, for example a mixture of propionic acid and acetic acid. The diazotization is advantageously carried out at temperatures from −10 to +30° C., e.g. from 0° C. to room temperature.

Coupling of the diazotized compound of formula (II) to the coupling component of formula (III) is likewise carried out in known manner, for example in an aqueous acidic medium or aqueous organic medium, advantageously at temperatures from −10 to 30° C., especially below 10° C. The acid used may be, for example, hydrochloric acid, acetic acid, propionic acid, sulfuric acid or phosphoric acid.

The compounds of formula (II) are known or can be prepared in a manner known per se.

The coupling components of formula (III) are likewise known or can be prepared in a manner known per se, for example by reacting a 2,6-dichloropyridine derivative of formula IV

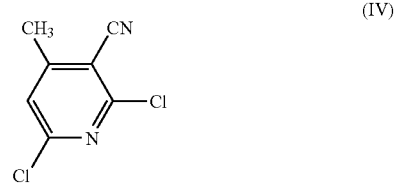

(IV)

with an appropriate amine.

The invention relates also to a method of producing mass-coloured plastics or polymeric colour particles which comprises mixing a high molecular weight organic material with a tinctorially effective amount of at least one azo dye of formula (I).

The colouring of the high molecular weight organic substances using the azo dye of formula (I) is carried out, for example, by using roll mills, mixing apparatus or grinding apparatus to admix such a dye with such substrates, the dye being dissolved or finely distributed in the high molecular weight material. The high molecular weight organic material with the admixed dye is then processed according to methods known per se, such as, for example, calendering, compression moulding, extrusion, coating, spinning, pouring or injection moulding, as a result of which the coloured material acquires its final form. Admixture of the dye can also be effected immediately prior to the actual processing step, for example by simultaneously continuously feeding, directly into the intake zone of an extruder, a solid, for example pulverulent, dye and a granulated or pulverulent high molecular weight organic material and, where appropriate, also other ingredients, such as additives, the constituents being mixed in just before being processed. Generally, however, preference is given to mixing the dye into the high molecular weight organic material beforehand, since more uniformly coloured substrates can be obtained.

In order to produce non-rigid shaped articles or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the colorant. It is also possible, in order to achieve different colour shades, to add to the high molecular weight organic substances, in addition to the azo dye of formula I, also other pigments or other colorants in the desired amounts, optionally together with further additives, for example fillers or siccatives.

Preference is given to the colouring of thermoplastic plastics especially in the form of fibres. Preferred high molecular weight organic materials that can be coloured in accordance with the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Polyester and polyamide are especially preferred. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBT); also polycarbonates, e.g. those obtained from α,α-dimethyl-4,4-dihydroxy-diphenylmethane and phosgene, or polymers based on polyvinyl chloride and also on polyamide, for example polyamide 6 or polyamide 6.6.

Since the compounds of formula (I) according to the invention contain at least 4 active H atoms (NH and OH groups, respectively), mixing the dye with the monomers and incorporation thereof in the form of a comonomer directly into the polymer skeleton is possible, provided that the monomers contain reactive groups that react with the active hydrogen atoms of the NH, OH or SH groups. Examples of such monomers include epoxides (epoxy resins), isocyanates (polyurethanes) and carboxylic acid chlorides (polyamides, polyesters).

The invention accordingly relates also to a method of producing mass-coloured plastics or polymeric colour particles that comprises causing a mixture comprising at least one monomer that contains at least one NH— or OH— reactive group and is capable of polymerisation, polyaddition or polycondensation reactions to react with at least one compound of formula I.

The present invention relates also to the use of compounds of formula I in the production of mass-coloured plastics or polymeric colour particles and to the plastics and polymeric colour particles coloured using the compounds of formula I.

The dyes according to the invention impart to the above-mentioned materials, especially polyester materials, level colour shades of high tinctorial strength that have good in-use fastness properties, especially very good high-temperature light fastness.

The dyes according to the invention can also readily be used together with other dyes to produce blended shades.

The dyes according to the invention can furthermore be used for coating applications of any kind.

The azo dyes of formula (I) according to the invention are furthermore suitable as colorants in the production of colour filters, especially for visible light in the range from 400 to 700 nm, for liquid crystal displays (LCDs) or charge combined devices (CCDs).

The production of colour filters by sequential application of a red, blue and green colorant to a suitable substrate, for example amorphous silicon, is described in GB-A 2 182 165. The colour filters can be coated, for example, using inks, especially printing inks, that comprise the azo dyes according to the invention, or can be produced, for example, by blending the azo dyes according to the invention with chemically, thermally or photolytically structurable high molecular weight material. The further production can be carried out, for example, analogously to EP-A 654 711 by application to a substrate, such as an LCD, followed by photo-structuring and development. Other documents that describe the production of colour filters include U.S. Pat. No. 5,624,467, Displays 14/2, 115 (1993) and WO 98/45756.

The colour filters that are produced for liquid crystal displays (LCDs) using the azo dyes according to the invention are distinguished by high transmission of colour dots.

The invention relates also to the use of an azo dye according to the invention as a colorant in the production of colour filters.

The following Examples serve to illustrate the invention.

I. PREPARATION EXAMPLES

I.1 Compound of Formula (Ia)

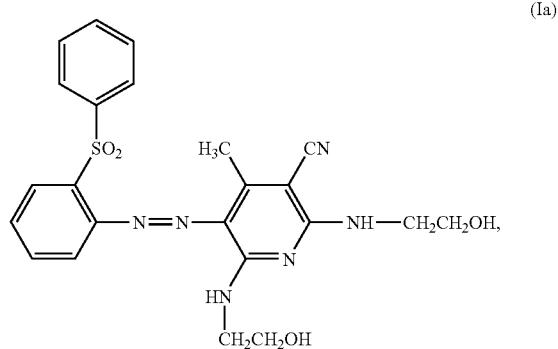

A. Synthesis of 2,6-bis(2-hydroxyethylamino)-3-cyano-4-methylpyridine 1075 ml of ethanolamine are introduced at room temperature (RT) into a plane-ground flask. Using a powder funnel, 472.3 g of 2,6-dichloro-3-cyano-4-methylpyridine are introduced in the course of 30 min. The exothermic reaction is cooled using a water bath. The product quickly dissolves, the exothermic reaction subsiding. After 30 minutes the internal temperature is 30° C., and a further 100 ml of ethanolamine is added.

The solution is stirred for a further 10 min. while cooling with a water bath, and subsequently heated to an internal temperature of 115° C. After 20 min. the internal temperature reaches 135° C., and the flask is cooled again using a water bath. The reaction mixture is left to stand overnight at RT and then stirred for a further 4 hours at 115° C. While cooling with an ice bath, the reaction solution is subsequently poured into 5 litres of 1N hydrochloric acid; after a short time a precipitate is formed. 1 litre of 1N hydrochloric acid is added and the light brown suspension is stirred for 2 hours, the internal temperature rising to RT. The precipitate is filtered off, washed with 1 litre of 1N hydrochlirc acid and 10 litres of water and subsequently dried for 2 days at 50° C. in a vacuum drying chamber.

Yield: 551.8 g (93.4%)

B. Diazotization with 2-aminodiphenylsulfone 14.7 g of 2-aminodiphenylsulfone are suspended in 160 ml of glacial acetic acid. 18 g of 32% hydrochloric acid are then added and, at 15–18° C., 15.3 ml of 4N sodium nitrite solution are added dropwise. After stirring for 1 hour at 15–18° C., excess nitrite is destroyed by the addition of 10% sulfamic acid.

14.5 g of 2,6-bis(2-hydroxyethylamino)-3-cyano-4-methylpyridine are introduced into 250 ml of water. After the dropwise addition of 5 drops of 2,4,7,9-tetramethyl-5-decyne-4,7-diol and 10 g of 32% hydrochloric acid, the solution is cooled to 15° C. 50 g of ice, the solution of the diazonium salt of 2-aminodiphenylsulfone and 100 ml of water are then added. The reaction mixture is stirred for 1 hour, and then a further 200 ml of water is added. The precipitate is filtered off, washed and dried.

Yield: 29.1 g (100%)

I.2 Compound of Formula (Ib)

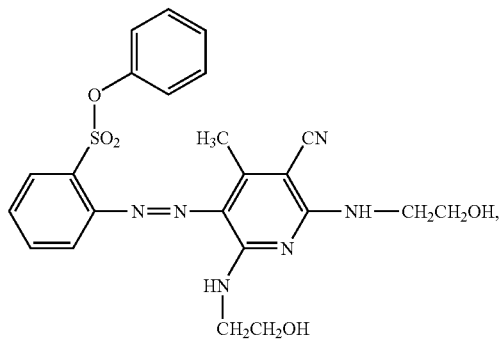

(Ib)

7.5 g of 2-aminobenzenesulfonic acid phenyl ester are dissolved in 80 ml of glacial acetic acid. Subsequently, 8 g of 32% hydrochloric acid and, at 15–20° C., 7.6 ml of 4N sodium nitrite solution, are added dropwise. After stirring for 1 hour at 15–20° C., excess nitrite is destroyed by the addition of 10% sulfamic acid.

7.1 g of 2,6-bis(2-hydroxyethylamino)-3-cyano-4-methylpyridine are introduced into 100 ml of water. After the dropwise addition of 2 drops of 2,4,7,9-tetramethyl-5-decyne-4,7-diol and 5 g of 32% hydrochloric acid, the solution is cooled to 15° C. The solution of the diazonium salt of 2-aminobenzenesulfonic acid phenyl ester is then added at 15–20° C. The suspension is stirred for 1 hour without cooling, and then 50 ml of water are added. The precipitate is filtered off, washed and dried.

Yield: 14.2 g (96%)

I.3 Compound of Formula (Ic)

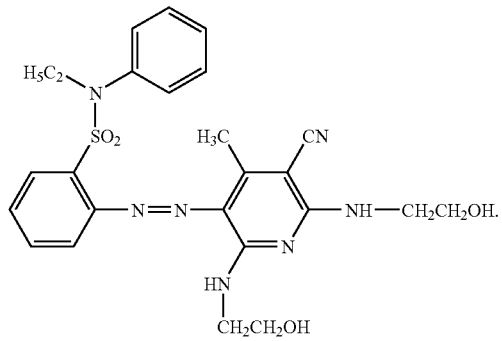

(Ic)

11.6 g of 2-aminobenzenesulfonic acid N-phenyl-N-ethylamide are dissolved in 100 ml of glacial acetic acid. Subsequently, 14 g of 32% hydrochloric acid and, at 15–20° C., 10 ml of 4N sodium nitrite solution, are added dropwise. After stirring for 1 hour at 15–20° C., excess nitrite is destroyed by the addition of 10% sulfamic acid.

9.9 g of 2,6-bis(2-hydroxyethylamino)-3-cyano-4-methylpyridine are introduced into 160 ml of water. After the dropwise addition of 5 drops of 2,4,7,9-tetramethyl-5-decyne-4,7-diol and 6.6 g of 32% hydrochloric acid, 50 g of ice are added. The solution of the diazonium salt of 2-aminobenzenesulfonic acid N-phenyl-N-ethylamide is then added dropwise at 15–20° C. The suspension is stirred for 1 hour without cooling and then 100 ml of water are added. The precipitate is filtered off, washed and dried and recrystallised from ethanol.

Yield: 18.2 g (87%)

II. APPLICATION EXAMPLES

II.1. Production of a Colour Filter for Liquid Crystal Displays (LCDs)

In a 100 ml glass vessel containing 83.3 g of zirconium ceramic beads, 2.8 g of the azo dye according to Example I.1, 0.28 g of Solsperse® 5000, 4.10 g of Disperbyk® 161 (dispersing agent, 30% solution of a high molecular weight block copolymer, containing groups having affinity for the pigment, in n-butyl acetate/1-methoxy-2-propyl acetate 1:6, BYK Chemie) and 14.62 g of 1-methoxy-2-propyl acetate (MPA) are stirred at 23° C. for 10 minutes at 1000 revs/min. and for 180 minutes at 3000 revs/min. using a Dispermat. After the addition of 4.01 g of an acrylate polymer binder (35% solution in MPA), stirring is carried out at room temperature for 30 minutes at 3000 revs/min. Following removal of the beads, the dispersion is diluted with an equal weight of MPA.

Using a spin-coating apparatus, a glass substrate (Corning type 1737-F) is coated with the resulting dispersion and centrifuged for 30 seconds at 1000 revs/min. The layer is dried on a hot plate for 2 minutes at 100° C. and for 5 minutes at 200° C. The resulting layer thickness is 0.4 µm.

The following azo dyes (Tables 1–18), which are likewise suitable for mass-colouring plastics, can be prepared analogously to Example I.1:

TABLE 1

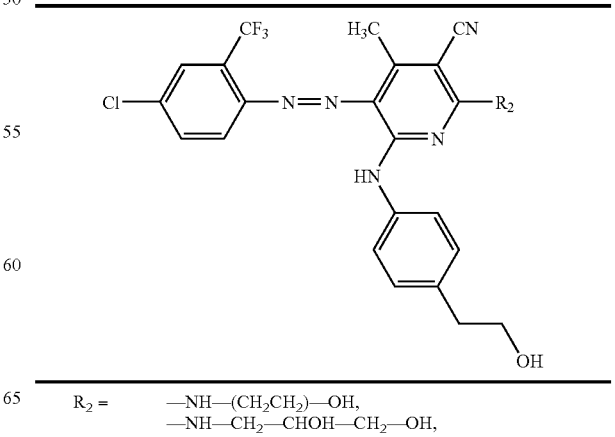

R$_2$ = —NH—(CH$_2$CH$_2$)—OH,
—NH—CH$_2$—CHOH—CH$_2$—OH,

TABLE 1-continued

—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

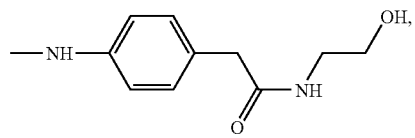

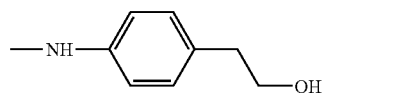

TABLE 2

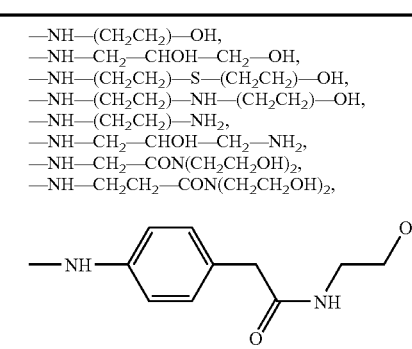

R₁ = R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

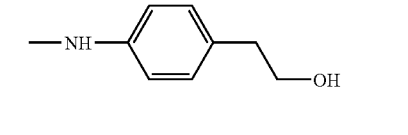

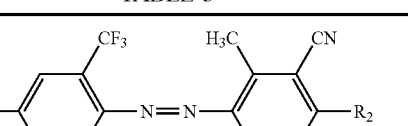

TABLE 3

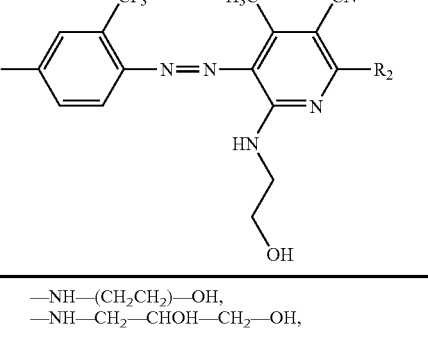

R₂ =  —NH—(CH₂CH₂)—OH,
—NH—CH₂—CHOH—CH₂—OH,

TABLE 3-continued

—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

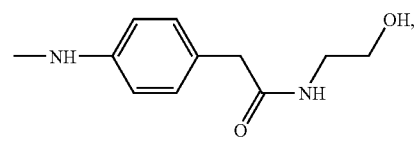

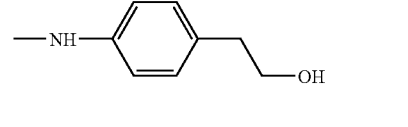

TABLE 4

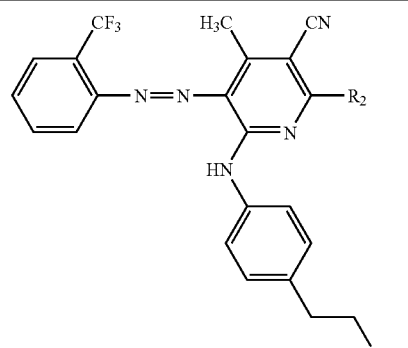

R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

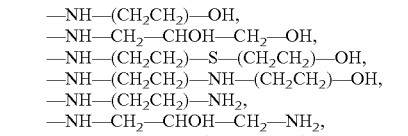

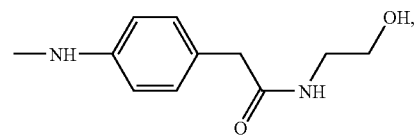

TABLE 5

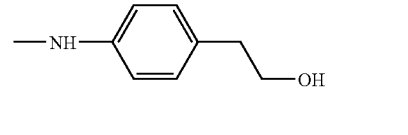

R₁ = R₂ =  —NH—(CH₂CH₂)—OH,
—NH—CH₂—CHOH—CH₂—OH,

TABLE 5-continued

—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

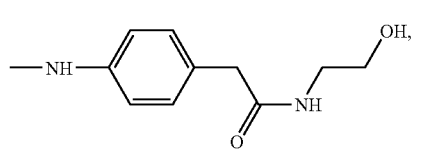

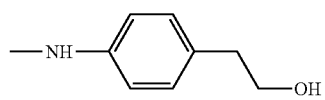

TABLE 6

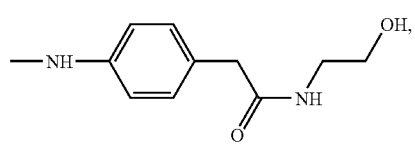

R$_2$ = —NH—(CH$_2$CH$_2$)—OH.
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

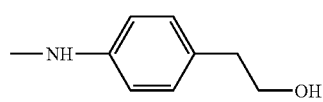

TABLE 7

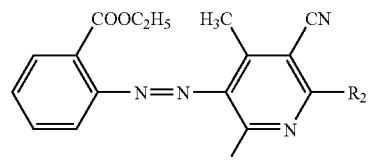

R$_2$ = —NH—(CH$_2$CH$_2$)—OH,
—NH—CH$_2$—CHOH—CH$_2$—OH,
—NH—(CH$_2$CH$_2$)—S—(CH$_2$CH$_2$)OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

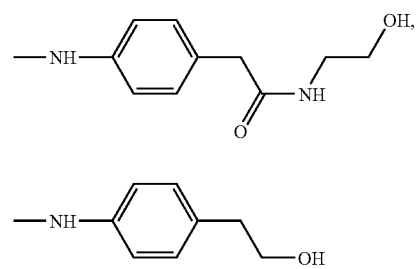

TABLE 8

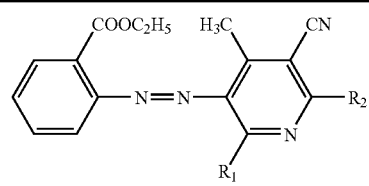

R$_1$ = R$_2$ = —NH—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

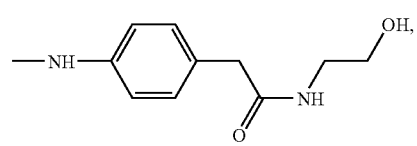

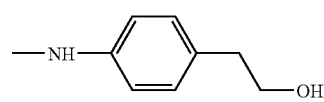

TABLE 9

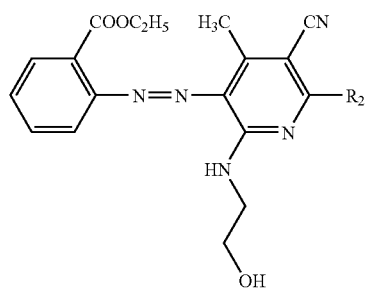

R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

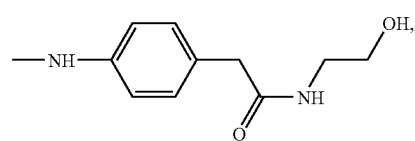

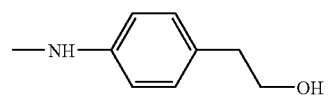

TABLE 10

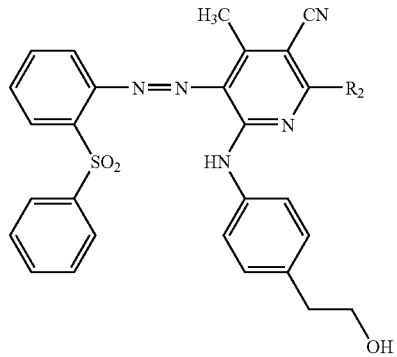

R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

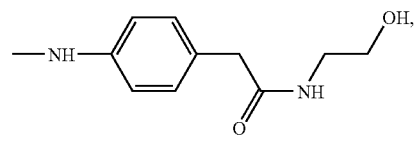

TABLE 10-continued

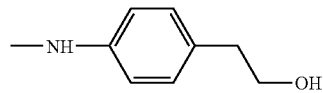

TABLE 11

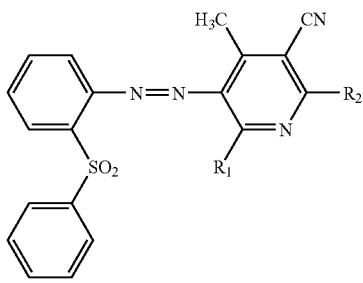

R₁ = R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

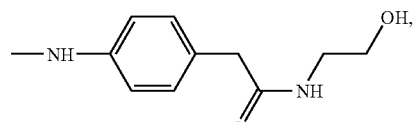

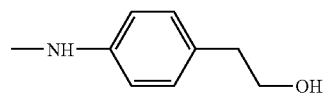

TABLE 12

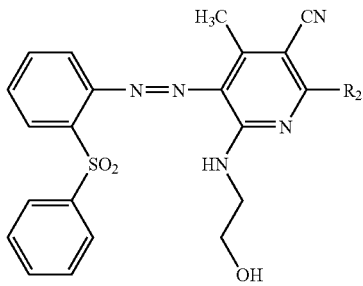

R₂ =  —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

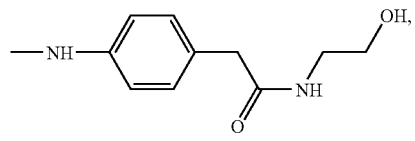

TABLE 12-continued

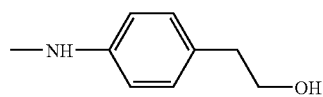

TABLE 13

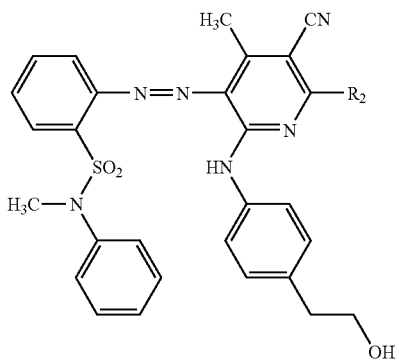

R₂ = —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

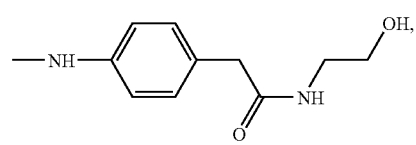

TABLE 14

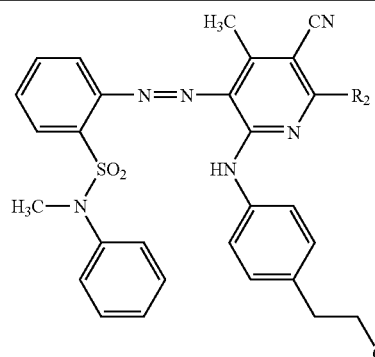

R₁ = R₂ = —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

TABLE 14-continued

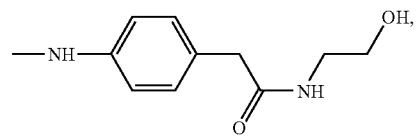

TABLE 15

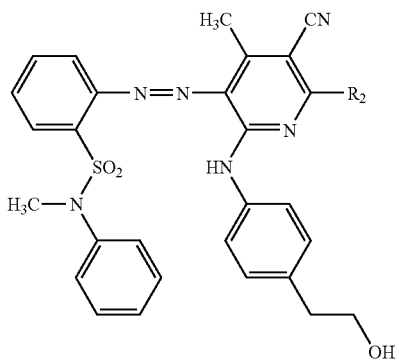

R₂ = —NH—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

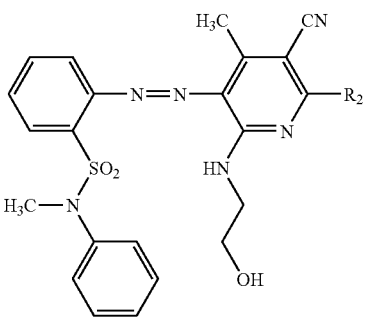

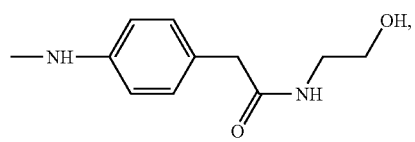

TABLE 16

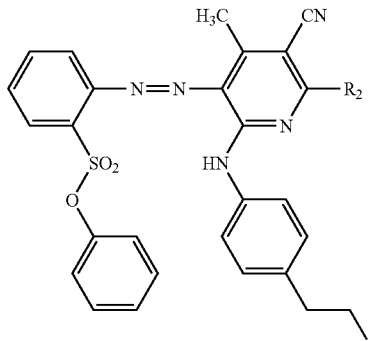

R₂ = —NH—(CH₂CH₂)—OH,
—NH—CH₂—CHOH—CH₂—OH,

TABLE 16-continued

—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

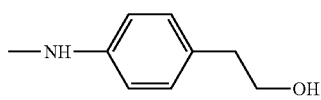

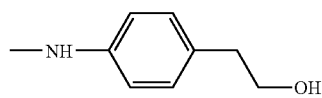

TABLE 17

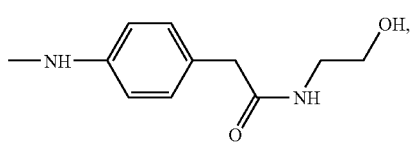

| $R_1 = R_2 =$ | —NH—(CH₂CH₂)—OH, |
| --- | --- |
| | —NH—CH₂—CHOH—CH₂—OH, |
| | —NH—(CH₂CH₂)—S—(CH₂CH₂)—OH, |
| | —NH—(CH₂CH₂)—NH—(CH₂CH₂)—OH, |
| | —NH—(CH₂CH₂)—NH₂, |
| | —NH—CH₂—CHOH—CH₂—NH₂, |
| | —NH—CH₂—CON(CH₂CH₂OH)₂, |
| | —NH—CH₂CH₂—CON(CH₂CH₂OH)₂, |

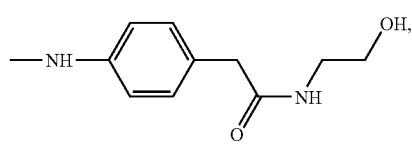

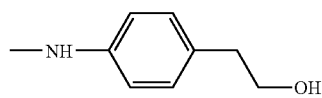

TABLE 18

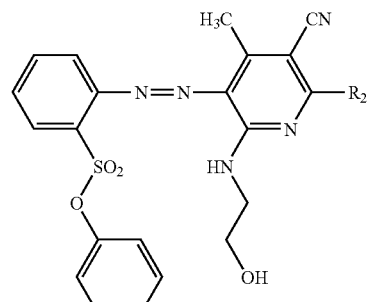

| $R_2 =$ | —NH—(CH₂CH₂)—OH, |
| --- | --- |
| | —NH—CH₂—CHOH—CH₂—OH, |
| | —NH—(CH₂CH₂)—S—(CH₂CH₂)—OH, |
| | —NH—(CH₂CH₂)—NH—(CH₂CH₂)—OH, |
| | —NH—(CH₂CH₂)—NH₂, |
| | —NH—CH₂—CHOH—CH₂—NH₂, |
| | —NH—CH₂—CON(CH₂CH₂OH)₂, |
| | —NH—CH₂CH₂—CON(CH₂CH₂OH)₂, |

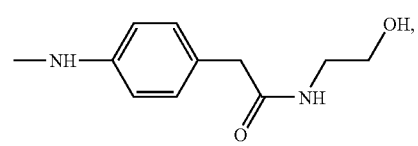

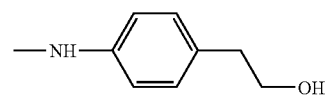

What is claimed is:
1. An azo dye of formula I

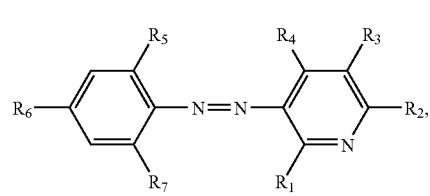

wherein
$R_1$ and $R_2$ are each independently of the other —NH—(CH₂CH₂)—OH, —NH—CH₂—CHOH—CH₂—OH, —NH—(CH₂CH₂)—S—(CH₂CH₂)—OH, —NH—(CH₂CH₂)—NH—(CH₂CH₂)—OH, —NH—(CH₂CH₂)—NH₂, —NH—CH₂—CHOH—CH₂—NH₂, —NH—CH₂—CON(CH₂CH₂OH)₂, —NH—CH₂CH₂—CON(CH₂CH₂OH)₂,

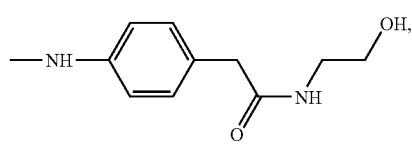 or

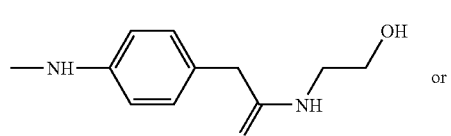

$R_3$ is —CN or —CONH$_2$,
$R_4$ is methyl or trifluoromethyl,
$R_5$ is —CF$_3$, —COOC$_2$H$_5$,

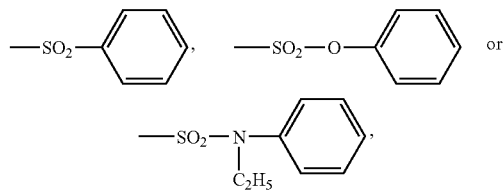

$R_6$ is hydrogen or chlorine, and
$R_7$ is hydrogen, chlorine, bromine or —NO$_2$.

2. An azo dye of formula I according to claim 1 wherein $R_3$ is —CN and $R_4$ is methyl.

3. An azo dye of formula I according to claim 1 wherein $R_1$ and $R_2$ are

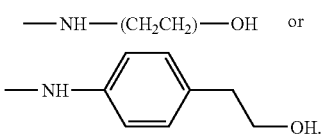

4. An azo dye of formula I according to claim 1 wherein $R_7$ is hydrogen.

5. An azo dye of formula Ia, Ib, Ic or Id (Ia)

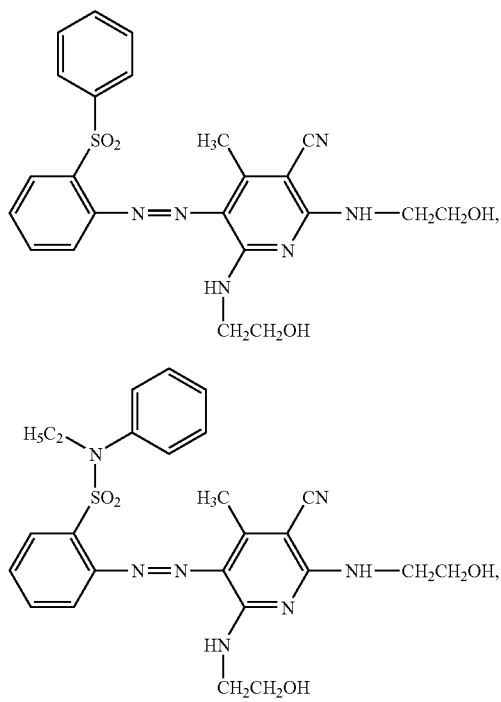

(Id)

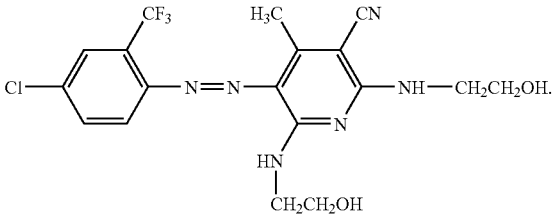

6. A process for the preparation of an azo dye of formula (I) according to claim 1, which comprises diazotizing a compound of formula (II)

(II)

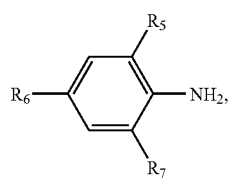

wherein $R_5$, $R_6$ and $R_7$ are as defined in claim 1, according to a conventional method and then coupling the diazotized compound with a coupling component of formula III (III)

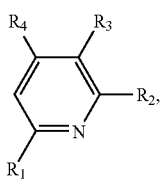

wherein $R_1$, $R_2$ $R_3$ and $R_4$ are as defined in claim 1.

7. A method of producing mass-coloured plastics or polymeric colour particles that comprises mixing a high molecular weight organic material with a tinctorially effective amount of at least one azo dye of formula (I) according to claim 1.

8. A method of producing mass-coloured plastics or polymeric colour particles that comprises causing a mixture comprising at least one monomer that contains at least one NH-, CH or SH-reactive group and is capable of polymerisation, polyaddition or polycondensation reactions to react with at least one compound of formula I according to claim 1.

9. Plastics or polymeric colour particles coloured in accordance with a method according to claim 7.

10. Plastics or polymeric colour particles coloured in accordance with a method according to claim 8.

11. A method of producing colour filters that comprises coating a substrate with a high molecular weight organic material that contains a tinctorially effective amount of at least one azo dye of formula (I) according to claim 1.

* * * * *